Sept. 18, 1956 O. O. FIET 2,763,839

DIPLEXER AND SIDEBAND FILTER ARRANGEMENT

Filed May 23, 1952 4 Sheets-Sheet 1

INVENTOR
Owen O. Fiet
BY
Charles H. Brown
ATTORNEY

INVENTOR
Owen O. Fiet
BY
Charles H. Brown
ATTORNEY

INVENTOR.
Owen O. Fiet
BY Charles H. Brown
ATTORNEY

DIPLEXER AND SIDEBAND FILTER ARRANGEMENT

Filed May 23, 1952 4 Sheets-Sheet 4

INVENTOR
Owen O. Fiet
BY
Charles H. Brown
ATTORNEY

United States Patent Office 2,763,839
Patented Sept. 18, 1956

2,763,839

DIPLEXER AND SIDEBAND FILTER ARRANGEMENT

Owen Orlando Fiet, Camden, N. J., assignor to Radio Corporation of America, a corporation of Delaware Application May 23, 1952, Serial No. 289,483

26 Claims. (Cl. 333—11)

This invention relates to diplexing and filtering systems and particularly to such systems for combining and filtering two program-modulated radio frequency signals.

Diplexing two program-modulated frequency signals, such as television aural and visual signals, for application to a common radiating system is well known in the art. One method of introducing visual and aural signal modulated carriers to one antenna is popularly known as notch diplexing. In essence, the notch diplexer consists of a transmission line circuit arrangement having auxiliary frequency selective circuit elements, usually reflection filters of a highly efficient type, interconnected at proper points to provide a high impedance to radio frequency energy over a wide band of frequencies except for one or more very narrow frequency ranges in which the impedance is extremely low. The term "notch" circuit is readily suggested by one form of impedance frequency diagram popularly used which illustrates a relatively narrow depression in a rather uniform plateau-like curve. When using a notch diplexer, a notch is placed in the picture passband centered about the aural carrier and the elements of the reflection filter are so constructed and located that there is negligible mutual interaction between the aural and visual carriers.

A notch diplexer of the double bridge type, an improved form of which is utilized as part of the present invention, is described and claimed in copending U. S. application, Serial No. 207,071, filed January 22, 1951, by Irwin E. Goldstine, now Pat. No. 2,661,424, issued on December 1, 1953, and assigned to the assignee of this application.

Present television broadcast standards require the transmission of a type of visual signal which is termed a vestigial sideband signal. Vestigial sideband picture transmission refers to the type of modulation imposed on the transmitted carrier wave and consists of the carrier wave plus one sideband in its entirety and only a part of the other sideband. One method of achieving this type of modulation consists of modulating the carrier wave to produce both sidebands and then filtering part of the undesired sideband.

Heretofore, in television transmitter systems, the function of diplexing the visual and aural signals has been separated both physically and electrically from that of vestigial sideband filter. The present invention, on the other hand, combines a notch diplexing arrangement with a vestigial sideband filter of novel design in compact and highly desirable manner and utilizes the interaction between the various circuit elements to achieve highly efficient operation.

When it is attempted to combine the notch diplexer with the vestigial sideband filter, various problems arise which have been solved by the system of the present invention. To meet the rigid requirements of vestigial sideband transmission for both the present very high frequency television channels and the proposed ultrahigh frequency channels between 470 and 890 megacycles, a unitary construction of double-bridge type notch diplexer and vestigial sideband filter entails numerous problems.

Considering for the moment only the ultrahigh frequency television channels 14 through 83, from 470 to 890 megacycles, it is seen that the percentage bandwidth occupied by a 6 megacycle signal on one of the lower channels of the ultrahigh frequency band is nearly twice as great as the percentage bandwidth of the same signal on one of the high channels.

In an attenuation versus frequency function, the slope of an attenuation curve of a filter near the points of maximum attenuation will vary, for a particular filter arrangement, depending upon the frequency which the filter is to reject.

The arrangement of the present invention has vestigial sideband filter elements whose reactance slope near the point of maximum attenuation of the sideband filter can be adjusted. The filter elements can be tuned to resonance at any frequency within a frequency range of 2 to 1, and the reactance slope can be set to any desired value within wide design limits. Due to the design of the vestigial sideband filter elements themselves and the method of coupling these filter elements across the transmission lines forming the side arms of the notch diplexer, reflections of energy at frequencies removed from the resonant frequency of the filter element are substantially eliminated. This construction results in an impedance characteristic which is substantially flat (very smooth) over the entire desired passband.

The notch diplexer used in this invention employs resonant cavity structures for the reflection filters. These resonant cavities have a very high Q, of the order of 25,000 to 50,000. Such a highly efficient resonating structure enables the "notch" in the picture passband to severely attenuate any picture modulation components at that frequency and at the same time to form a very low impedance reflection point for the sound carrier. The reflection filter cavities have a structural arrangement which permits the adjustment of the degree of coupling to the transmission line arms of the notch diplexer with little effect on the resonant frequency of the reflection filter elements themselves.

One aspect of this invention is concerned with a tuning system or frequency control system for adjusting the resonant frequency of the resonant cavities. In one tuning arrangement, fine tuning or automatic frequency control is accomplished by sealing the entire diplexer and filter from the surrounding air and adjusting the degree of pressure or vacuum within the diplexer and filter combination to control the tuning of the reflection filters. The pressure or vacuum within the diplexer and filter may be adjusted manually at the filter or at a remote point, or may be automatically maintained at the proper value by a servosystem operative in response to a frequency or phase comparison circuit which compares the resonant frequency of the reflection filters with a frequency standard.

A further fine tuning arrangement involves keeping the temperature of the reflection filters higher than the ambient, and adding more or less heat from an external source as required to keep the filter elements themselves at the proper size for resonant operation at the desired frequency. The external heating source may be controlled on a frequency comparison basis like the pressure regulation system outlined above, or may be actuated by thermo-responsive devices on the filter elements themselves to maintain these elements at the proper operating temperature.

Further, the tuning of these reflection filters may be accomplished automatically by either of two mechanical arrangements which adjust tuning slugs associated with the filter elements. One mechanical system includes a mechanical linkage for moving tuning slugs in or out of the resonant cavities, while the other utilizes a hydraulic control over the movement of the tuning slugs. A servo-mechanism to actuate the mechanical adjusting systems may be made automatic by the frequency or phase comparison system mentioned above with respect to the pressure control arrangement.

An object of the invention is to feed high frequency energy sources to a common load device without interaction between the separate sources while at the same time filtering unwanted frequency components.

Another object of the invention is to provide a single unitary construction of cooperating circuit elements for diplexing two high frequency energy sources to a common load device and for filtering undesired energy from said sources.

A particular object of this invention is to provide a circuit arrangement capable both of diplexing two transmitters to a single antenna and filtering an undesired sideband of one transmitter.

A further object of the invention is to provide a diplexing arrangement including as an integral part thereof vestigial sideband filter elements capable of highly efficient operation.

Yet another object of the invention is to provide a diplexer arrangement including filter elements therein whose resonant frequency and electrical coupling to the diplexer may be independently adjusted.

Another object of the invention is to provide a circuit arrangement for diplexing two program-modulated radio frequency signals and employing simple and readily adjusted filter elements to alter the content of modulation products of one of the program-modulated signals, capable of meeting very rigid specifications of exact degrees of attenuation over a broad frequency band.

A still further object of this invention is to provide a novel tuning and frequency control system for resonant cavity elements which may be adjusted manually or automatically actuated by a servosystem.

Another object of this invention is to provide a novel fine tuning and automatic frequency control arrangement for cavity resonator elements employing a servosystem operative to change the effective mechanical size of the resonator elements themselves.

In accordance with the present invention, these and other objects are attained by a circuit arrangement including two balanced-to-unbalanced transmission line bridging networks having their balanced terminals interconnected by a pair of transmission lines of equal length. The pair of equal length transmission lines form the side arms of a double bridge notch diplexer. Coupled to these side arms are sharply tuned reflection filters (also referred to as notch filters) at points differing in location with respect to each of the bridging networks by one-quarter wavelength at a predetermined frequency.

Also connected across each of the side arms of the double bridge notch diplexer are sideband filter elements whose tuning and coupling to the diplexer arm act to alter the content of modulation products of one of the program modulated signals applied to the diplexer. The sideband filter elements are coaxial cavities having a Q of the order of 8,000 to 20,000 for the ultrahigh frequency television band. The degree of coupling of these coaxial cavities to the side arms of the double bridge diplexer can be varied with small effect on the resonant frequency of the coaxial sideband filter elements themselves. In a preferred arrangement, two of these coaxial sideband filter elements are utilized across each side arm with a spacing therebetween which is electrically substantially an odd number of one-quarter wavelengths.

The sound notch reflection filters themselves employ a spherical cavity resonator having a Q of the order of 25,000 to 50,000 over the ultrahigh frequency television band from 470 to 890 megacycles.

The coupling of the reflection filters to the side arm transmission lines and their spacings from the adjacent sideband filters are utilized to give an iterative impedance match of the sideband filters over a portion of the band of frequencies from one of the signal sources. The susceptance of the reflection filters at another frequency within the passband is balanced out by interposing an electrically short section of line of different impedance at another point on the side arm transmission lines spaced from the point where the reflection filters are coupled thereto.

The two sources of program-modulated energy to be combined on a single output transmission line are coupled to the double bridge notch diplexer and vestigial sideband filter arrangement of this invention in the following manner: One source of program modulated energy is coupled to one set of unbalanced terminals of one bridging network, and a terminating resistance having an ohmic value equal to the characteristic impedance determined by the associated transmission line is connected to the other set of unbalanced terminals of the same bridging network. The other source of program-modulated energy is connected to one set of unbalanced terminals of the other bridging network, and the output transmission line is coupled to the remaining set of unbalanced terminals of the other bridging network.

The reflection filters are tuned to or very near to the frequency of the second source of program-modulated energy. Energy from this second source travels down each side arm and is returned by the reflection filters. Due to the line lengths between the bridging network and the reflection filters, this energy is impressed across the bridging network upon its return in push-pull and appears across the output transmission line single-sided or unbalanced with respect to a point of reference potential.

The invention will be described in detail with reference to the accompanying drawing, in which.

Figures 1, 3:
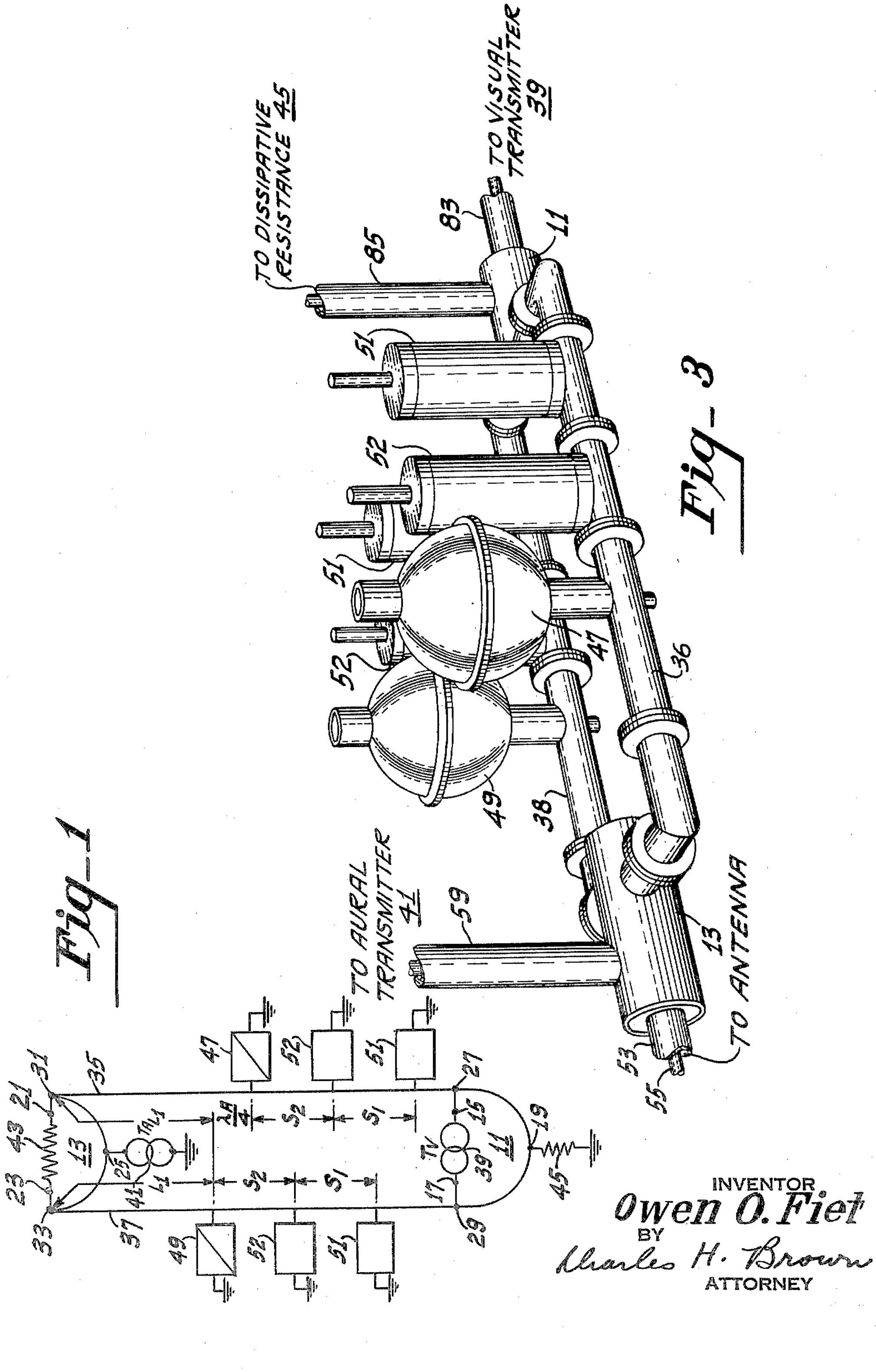
Fig. 1 is a schematic diagram illustrating the diplexer and sideband filter arrangement of the invention.
Fig. 3 is a perspective view of another practical embodiment of the invention.

Referring to Fig. 1, the operation of the invention will be described with reference to a schematic diagram drawn according to well-known practice to represent the structure of the center conductor of a concentric transmission line arrangement. A pair of bridging networks 11, 13 are shown which have unbalanced connection terminals 15, 17, 19 and 21, 23, 25 and balanced connection terminals 27, 29 and 31, 33. The balanced terminals 27 and 31, 29 and 33 are respectively joined by transmission line sections 35 and 37. The transmission line sections 35 and 37 form side arms of a double-bridge notch diplexer.

Each of the unbalanced connection terminals 15, 17, 19, 21, 23 and 25 is adapted to have connected thereto either a radio frequency generator or a load which is single-sided or unsymmetrical with respect to ground or reference potential. These connections are made (usually by shielded or coaxial lines) at some point external to the structure of the bridging networks 11, 13 and, by virtue of the line lengths and structural connections in the bridging networks themselves, the voltage across the unbalanced terminals 15, 17 or 21, appears in push-pull, that is to say, symmetrical balanced relation across the balanced terminals 27, 29 or 31, 33.

A first radio frequency generator 39 designated $T_v$, which may be a television picture transmitter, is connected to two of the unbalanced terminals 15, 17 of one bridging network 11 to present energy in push-pull (180° out of phase) relationship to the balanced connection terminals 27, 29. A second radio frequency generator 41, designated $T_a$, which may be a sound transmitter, is connected at the unbalanced terminal 25 of the second bridging network 13 to present energy in push-push (cophasal) relationship at the balanced connection terminals 31 and 33. A load element, shown here as a resistor 43, is connected to the unbalanced connection terminals 21 and 23 of the second bridging network 13 to obtain energy in push-pull relation from the balanced connection terminals 31 and 33.

A terminating resistor 45 is connected to the remaining unbalanced terminal 19 of the first bridging network 11 to correctly terminate the first bridging network 11 with respect to the remainder of the circuit elements.

Two identical reflection filters 47 and 49 are connected to the side arm transmission line sections 35 and 37. The connection points of the reflection filters 47 and 49 are located along the side arm transmission line sections 35 and 37 so that there is a difference in path length of a quarter-wavelength at the frequency of the second radio frequency generator 41, also designated $T_a$, from the balanced terminals 31 and 33. The reflection filters 47 and 49 have a very high Q and therefore are sharply tuned to present an extremely low impedance (for example, less than an ohm across a 50-ohm transmission line) to energy at the operating frequency of the second radio frequency generator 41.

In operation, signal energy from the second radio frequency generator 41 is presented in push-push relationship to the side arm transmission line sections 35, 37 by the bridging network 13. This energy travels down the side arms of the bridge and is substantially totally reflected by the operation of the reflection filters 47 and 49. The energy from the second generator 41 flowing in one side arm transmission line section 35 travels over a round trip path distance greater by twice a quarter-wavelength (a half-wavelength) than that in the other side arm transmission line 37 at the frequency of $T_a$ radio frequency generator 41. This energy returned by the reflection filters 47 and 49 is therefore impressed in push-pull or out-of-phase relationship across the load element 43, which may be, for example, an antenna, an output transmission line, or other utilization device. Any signal energy from the $T_a$ radio frequency generator 41 which is not reflected for any reason by the reflection filters 47 and 49 will continue in push-push relationship along the transmission line sections 35 and 37 and will be dissipated in the terminating resistor 45. This push-push energy from the $T_a$ radio frequency generator 41 will not be coupled into the $T_v$ radio frequency generator 39 because of its push-push relationship, since the terminals 15 and 17 to which the $T_v$ generator 39 is connected will be at the same instantaneous potential with respect to the arriving energy.

Furthermore, any signal energy from the first radio frequency generator 39, designated as $T_v$, which is impressed in push-pull relation on lines 35 and 37 and reflected by the action of the reflection filters 47 and 49 for any reason will be transformed because of the difference in line lengths from the generator terminals 27, 29 to each of the reflection filters 47 and 49 to push-push relationship instead of push-pull. The energy from the first radio frequency generator 39 which is reflected by the filters 47, 49 back toward the terminating resistor 45 is that energy originating in the first generator 39 having frequency components centered about the resonant frequency of the notch reflection filters 47, 49. This push-push energy is also absorbed in the terminating resistor 45. From the above discussion, it can be seen that the two signals from separate sources $T_a$ and $T_v$ are diplexed onto a single transmission line in a simple manner without any interaction between the signal sources themselves.

The present invention, in addition to combining the outputs of two signal sources $T_a$ and $T_v$, is also directed to altering the content of modulation products from one of the signal sources. In the schematic arrangement shown in Fig. 1, $T_a$ represents a source of radio frequency signals such as an aural transmitter which presents the sound information to accompany a visual transmission, in this instance from a visual transmitter $T_v$ which has been designated the first radio frequency generator 39.

The visual information from the $T_v$ radio frequency generator 39 is impressed across the balanced output terminals 27 and 29 of the first bridging network 11 in push-pull. This energy travels down the equal length side arm transmission lines 35 and 37 and is impressed push-pull across the load element 43. The signal energy from the $T_v$ radio frequency generator 39 is subjected, however, to three separate filtering actions as it passes along the side arm transmission line sections 35 and 37. Progressing upwardly on the drawing from the balanced terminals 27 and 29 of the first bridging network 11, signal information from the $T_v$ generator 39 meets two identical sideband filters 51 which are tuned to resonance at a frequency to be greatly attenuated. At a spacing $S_1$ farther along the side arm transmission line sections 35 and 37, this energy from the $T_v$ generator 39 meets two additional identical sideband filters 52, which may be tuned to resonance at another frequency to be severely attenuated. These sideband filters 51 and 52 present a low shunt impedance to energy outside the desired passband, and consequently sharply attenuate energy in the frequency range of their tuning. At a third point farther along the side arm transmission line sections 35, 37 at a spacing $S_2$ from the sideband filters 52, the signal from the $T_v$ generator 39 is subjected to a filtering action by the reflection filters 47, 49. These reflection filters 47, 49 put a deep attenuation notch in the wide frequency band video signal from the $T_v$ generator 39 at the frequency of the sound information from the $T_a$ generator 41, thus preventing the video signal from the $T_v$ generator 39 from blanketing the sound information from the $T_a$ generator 41.

The sideband filters 51 and 52 have a high Q, of the order of 8,000 to 20,000 for the ultrahigh frequency television band, 470 to 890 megacycles. Any suitable design of highly selective filter elements may be employed for the sideband filters 51, 52. It has been found that coaxial cavities having a diameter ratio of outer to inner conductors of about 3.6 are satisfactory.

The reflection filters 47 and 49 have a very high Q, of the order of 25,000 to 50,000 for the ultrahigh frequency television band, 470 to 890 megacycles. To obtain such sharply tuned, highly selective filters, it has been found desirable to use spherical cavity resonators. A further discussion of suitable spherical cavity resonator structure is hereinafter given in the description of the embodiment shown in Fig. 2.

The two spacings, $S_1$ and $S_2$, mentioned above between the first and second sideband filters 51 and 52 and the second sideband filter and the reflection filter, respectively, are functions of the particular wavelength being transmitted through the circuit arrangement of the several filters 47, 49, 51 and 52, the constants of the transmission line sections 35 and 37, and the methods employed to tune the several filter elements 47, 49, 51 and 52. The method of arriving at the value of the two spacings, $S_1$ and $S_2$, in terms of a particular wavelength will be described below. The spacing $S_1$ is near an odd multiple of a quarter wavelength at a selected frequency in the band being transmitted for one set of design conditions for television picture and sound diplexing and filtering. The degree of coupling of the reflection filters 47 and 49 is adjusted to tune out the susceptance of the sideband filter elements 51, 52 at some particular frequency for which a high pass response of the entire diplexer and sideband filter arrangement is desired.

In television transmission, it is desirable to extend the response of the entire diplexer and sideband filter to more than 4 megacycles above visual carrier (the fundamental frequency of $T_V$). The coupling of the sound notch reflection filters 47 and 49 is adjusted so that the susceptance of the sound notch reflection filters is equal and opposite to the susceptance part of the normalized conductance of the transmission line due to the sideband filter elements 51 and 52 at a frequency which is 4.1 megacycles higher than visual carrier. This insures that the sideband filter elements 51 and 52 do not interpose a low impedance shunt path to frequencies which should not be attenuated.

Figure 2:
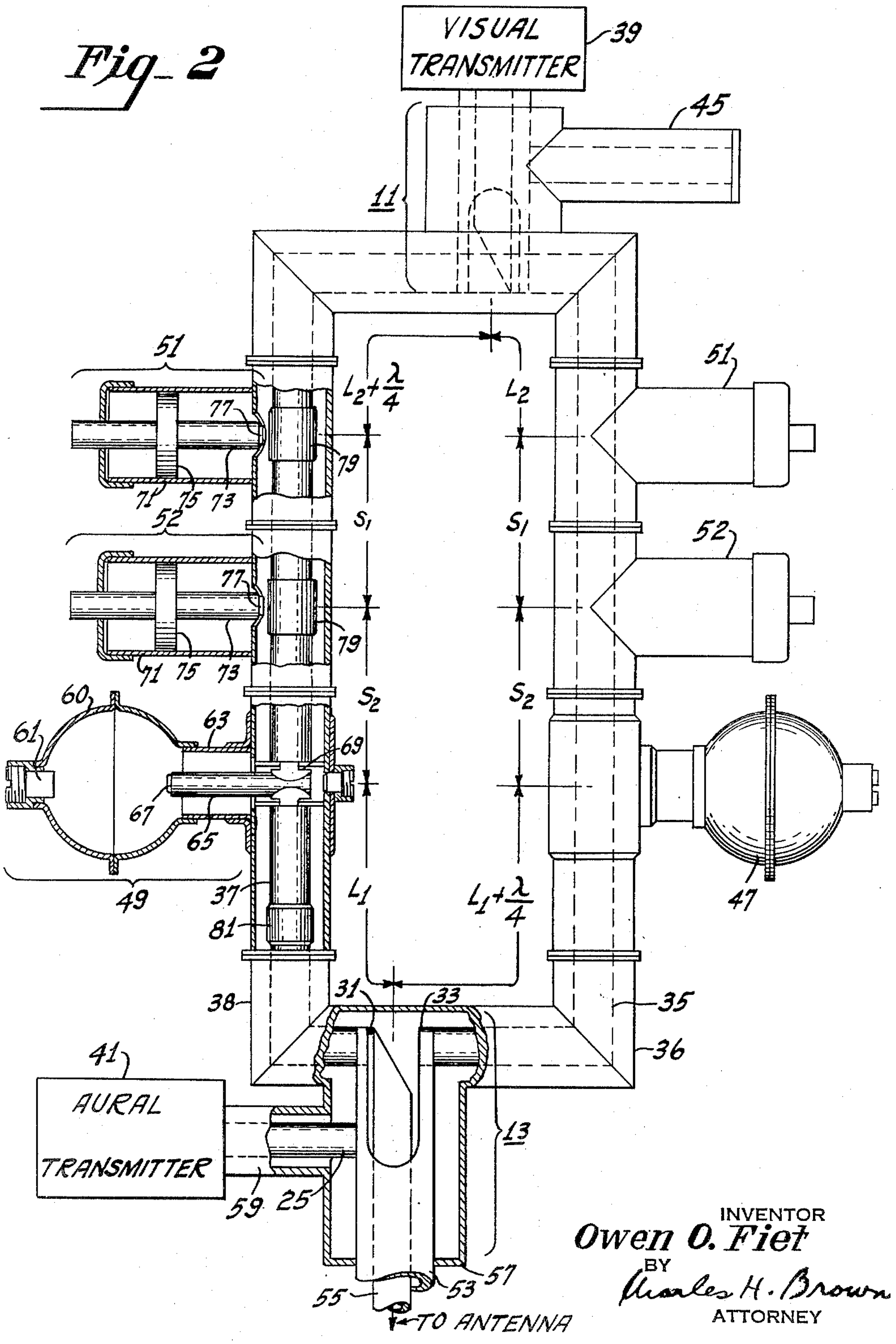
Fig. 2 is an illustration of a practical embodiment of the invention shown in Fig. 1.

Referring now to Fig. 2, there is shown a view, partly in cross section, of a practical embodiment of the invention shown in Fig. 1. Elements shown in Fig. 2 which are similar or identical with those shown in the schematic representation of Fig. 1 bear the same reference numerals. The two bridging networks 11 and 13 are identical in structure. The second bridging network 13 is shown in cross section for clarity, and the corresponding balanced terminals 31 and 33 are indicated as comprising the ends of bifurcated conductive tubular member 53 which is coaxial with an inner cylindrical conductor 55 and an outer cylindrical conductive shell 57. This bridging network follows the teachings of and operates in the manner described in U. S. Patent 2,454,907 to George H. Brown, issued November 30, 1948. The two unbalanced terminals of the second bridging network 13 comprise the point of connection 25 of the transmission line 59 from an aural transmitter 41 and the inner cylindrical conductor 55, together with the conductive tubular member 53. The output load device is shown in this figure as the coaxial transmission line consisting of the tubular member 53 and the inner cylindrical conductor 55, and is indicated as extending to an antenna.

The first bridging network 11 has a visual transmitter 39 connected to one unbalanced terminal and a dissipative load resistor 45 connected to the other unbalanced terminal. The side arm transmission line sections 35 and 37 are shown as being coaxial and having outer conductors 36 and 38 respectively. The side arm transmission lines 35 and 37 are equal in length between the balanced terminals of the bridging networks 11 and 13.

The physical arrangement of the bridging networks 11 and 13 is such that the difference in path length from the electrical center between the balanced terminals 31 and 33 to each of the reflection filters 47 and 49 returns energy emanating from transmitter 41 to the balanced terminals in push-pull relation. Although this difference in path length has been described above in conjunction with Fig. 1 as being one-quarter wavelength at the frequency of the aural transmitter 41, in practice some variation is permissible.

For television picture transmission in the ultrahigh frequency television band, it has been found that if the distances along lines 35, 37 from the first sideband filters 51 to the first bridging network 11, to which the visual transmitter 39 is connected, are made to differ by a quarter-wavelength at the carrier frequency of the visual transmitter 39, less reflection is encountered for the picture signal. Since the total length of the two side arm transmission line sections 35 and 37 must be equal, the distance from the center between the balanced terminals 31 and 33 of the second bridging network 13 to each of the reflection filters 47 and 49 will differ by a quarter-wavelength at the frequency of the visual transmitter. This results in the aural signal being returned to the balanced terminals 31 and 33 in slightly unbalanced relation. The unbalance of the aural transmitter 41 signal results in only an insignificantly small reduction in aural power output, and this arrangement obviates much more serious difficulties which would arise if the spacing were not symmetrical with respect to the visual transmitter 39.

One reflection filter 49 is shown in a cross-sectional view for purposes of description. The reflection filter comprises a spherical metallic cavity resonator 60 having a tuning slug 61 at one end. This tuning slug 61 is a metallic plug which may be adjusted in and out of the spherical cavity to alter the resonant frequency of the cavity. The spherical cavity resonator 60 is electrically coupled to the side arm transmission line 37, 38 by a short length of coaxial line whose outer conductor 63 electrically contacts the outer conductor 38 of the side arm transmission line as well as the shell of the spherical cavity resonator 60. The inner conductor 65 of this short piece of coaxial transmission line has one end electrically connected to the inner conductor 37 of the side arm transmission line. The other end of the inner conductor 65 extends a short distance electrically into the spherical cavity resonator 60. The coaxial coupling line 63, 65 is electrically one-half wavelength at the frequency to which the reflection filters are resonant; viz, the frequency of the aural transmitter.

The degree of coupling of the spherical cavity resonator 60 to the side arm transmission line 37, 38 to which it is connected is adjustable by means of a metallic slug 67 whose length beyond the physical end of the inner conductor 65 can be varied to alter the electrostatic coupling to the spherical cavity 60.

The side arm transmission line inner conductor 37 is shown as having an undercut portion 69 adjacent the mechanical connection of the inner conductor 65 of the short transmission line 63, 65 which couples the cavity resonator reflection filter 49 into the circuit. This undercut portion 69 is designed to reduce the reflections due to the transmission line "bump."

The sideband filters 51 and 52 are coaxial cavity resonators having an outer shell 71, an inner conductor 73, and an adjustable disc or shorting block 75. The sideband filters 51 and 52 are capacitively coupled to the side arm transmission line 37 by a slug 77 in the end of the inner conductor 73 cooperating with a sleeve 79 forming an electrically short, low impedance line section on the side arm transmission line 37. It should be noted that the sleeve 79 forming the low impedance section is preferably metallic or conductive, but may also be of dielectric material. The electrically short, low impedance line sections formed between the sleeve 79 and the outer conductor of the side arm transmission line acts to smooth out the "bump" in the transmission line at that point caused by the coupling of the inner conductor 73 of the coaxial-type sideband filter 51 to the side arm transmission line 37.

The capacitance between the sleeve 79 and slug 77 in the end of inner conductors 73 of the sideband filters 51 and 52 is utilized to balance out the inductive component of susceptance of each sideband filter of 51 and 52 at a frequency for which no attenuation is desired. For television picture transmission, the sideband filters 51 and 52 are tuned to parallel resonance at the carrier frequency of the visual transmitter 39.

The coaxial cavity resonators forming the sideband filters 51, 52 are tuned to resonance at frequencies outside the desired passband by adjusting the position of the shorting block 75 and the length of the inner conductor 73 so that the electrical distance from the shorting block 75 to the sleeve 79 forming the low impedance line section is effectively one-half wavelength at the frequency to be attenuated. To attenuate a band of frequencies, one sideband filter 51 is tuned to a selected frequency in the band to be attenuated, and the other sideband filter element 52 is tuned to a different selected frequency in the same band. The corresponding first sideband filter 51 on both transmission lines 35 and 37 will, of course, be tuned to the same frequency. This same condition is true with respect to the second sideband filter 52 on both transmission lines 35 and 37.

The slope of the reactance curve of each of the sideband filters 51 and 52 is determined, for a given resonance frequency tuning point, by the degree of coupling of the cavity resonator structure 71, 73, 75 to the side arm transmission line. In practice, it is often desirable, when a filter consists of a plurality of filter sections, to have a different reactance slope in one section from that of another section. Since the present invention provides a means for adjusting the reactance slope of each of the sideband filter elements 51 and 52, as well as means for tuning these filters, the filtering arrangement is particularly suited to altering the content of modulation products of one of the program-modulated signals. This filter arrangement may be adjusted to meet very rigid specifications of exact degrees of attenuation over a broad frequency band.

The spacing between the two sideband filters 51 and 52 is an odd quarter-wavelength at a frequency within the passband for which no attenuation is desired. For television picture transmission, the spacing may therefore be electrically expressed as:

$$S_1=(2n-1)\frac{\lambda_v}{4}$$

where $n$ is an integer and $\lambda_V$ is the wavelength in the transmission line at visual carrier frequency. This spacing will be shorter than the same wavelength in air because the two sleeves 79 at the points of coupling the sideband filters 51, 52 act to shorten the electrical length, and the wave velocity in the transmission line employed is somewhat smaller than the velocity of a free space wave.

The spacing $S_2$ between the second sideband filter 52 and the reflection filter 49 or 47 is determined by the following considerations: The reflection filter is used to tune out, that is, to parallel resonate, the reactance of the sideband filters 51 and 52 at a particular frequency in the passband for which no attenuation is desired. For a certain tuning and degree of coupling of a reflection filter 49 to the side arm transmission line 37, this reflection filter 49 will have a certain susceptance. The spacing $S_2$ is the distance along the side arm transmission line 37 from the coupling point of the nearest sideband filter 52 at which the susceptance component of admittance is equal and opposite in sign to that of the reflection filter at the above-mentioned frequency for which a high pass characteristic is required.

For one set of design conditions set forth below, this electrical spacing is found to be $$S_2=\frac{n\lambda_v}{2}+0.179\lambda_v$$

where $n$ is zero or an integer and $\lambda_V$ is the wavelength at visual carrier for the condition where the high pass frequency is $f_v+4$ megacycles. For the case where the high pass characteristics are desired for a frequency of $\lambda_V+4.1$ megacycles, $$S_2=\frac{n\lambda_v}{2}+0.172\lambda_v$$

The spacings $S_2$ given in the above two formulas are predicated upon the set of design conditions where the nearest sideband filter 52 to the reflection filter 47 or 49 has a reactance slope of 0.098 ohm per megacycle and a series resonant frequency 3.5 megacycles below visual carrier $f_v$, and the farthest-removed sideband filter 51 has a reactance slope of 0.407 ohm per megacycle and is tuned to series resonance 1.5 megacycles below visual carrier $f_v$.

The remaining source of irregularities in this transmission line circuit arrangement is the effect of the reflection filters 47, 49 at visual carrier frequency. Where the frequency of the aural transmitter 41 is higher than that of the visual transmitter 49, the susceptance of the reflection filters 47, 49 at visual carrier will be capacitive in character. To parallel resonate this susceptance at visual carrier, an inductive reactance may be placed in shunt across the line at an electrical spacing of one-half wavelength at visual carrier, or another capacitive reactance may be inserted one-quarter wavelength from the point of connection of the reflection filters 47, 49. A conductive sleeve 81 surrounding the inner conductor 37 acts as a lumped capacitance and may be spaced $$\frac{\lambda_v}{4}$$

from the junction of the inner conductor 65 of the short piece of coupling transmission line to the reflection filter 49. A sleeve of dielectric material may also be utilized if convenient.

Referring now to Fig. 3, there is shown a perspective view of a practical arrangement of the diplexer and sideband filter combination of the present invention. From the bridging network 11 like that described above in connection with Fig. 2, a coaxial transmission line 83 extends and is adapted to be connected to a visual transmitter. A second transmission line 85 is connected as explained above to an unbalanced terminal of the same bridging network 11 for connection to a dissipative load resistance 45. To the balanced terminals of the bridging network 11 are connected the two side arm transmission lines, the outside conductors 36, 38 of which are shown on this drawing. Arranged along each of the side arm transmission lines are three filters: two sideband filters 51 and 52 and a spherical cavity reflection filter 47 or 49.

The second bridging network 13 is shown as having one coaxial transmission line 59 extending therefrom and adapted to be connected to an aural transmitter 41. A second coaxial transmission line 53, 55 is shown extending from the second bridging network 13 to a load device, such as an antenna.

The electrical centers of the bridging networks 11 and 13 are displaced with respect to the center line between the side arm transmission lines 36, 38 so that the path length between the second bridging network 13 and one reflection filter 47 is one-quarter wavelength longer at the carrier frequency of the visual transmitter 39 than a similar path to the other reflection filter 49, as was explained above in conjunction with Fig. 2. Both of the side arm transmission lines 36, 38 have the same total length.

One embodiment of the invention successfully tried out in practice was designed for television picture and sound diplexing and simultaneous vestigial sideband filtering of the television picture information for a 6-megacycle channel from 848 to 854 megacycles. Referring specifically to Figs. 2 and 3, the various components had the following dimensions: The outer cylindrical shell 57 of the bridging networks 11 and 13 was 1/16 inch wall, 6⅛ inch outside diameter copper tubing. The side arm transmission lines 35, 36 and 37, 38 had inner conductors 35, 37 whose outside diameter was 1 5/16 inches. The outer conductors 36 and 38 of the side arm transmission line were made of 1/16 inch wall, 3⅛ inch copper tubing. The transmission line to the antenna 53, 55, the transmission line 59 to the aural transmitter 51, the transmission line 85 to the dissipative resistance 45, and the transmission line 83 to the visual transmitter 39 each was of the same dimensions and same material as the side arm transmission lines 35, 36 and 37, 38. The vestigial sideband filters 51 and 52 had an outer shell 71 made of 1/16 inch wall copper tubing of 6⅛ inch outside diameter, and the coaxial inner conductor 73 in each instance was 1⅝ inches in diameter. The shorting block 75 of the sideband filters 51, 52 was of brass.

The spherical reflection filters 47, 49 were identical. The spherical resonator shell 60 was of copper and had an inside diameter of 12 inches. The dimensions of the short coupling transmission line extending into the spherical cavity resonators had an inner conductor 65 whose diameter was 1⅚ inches and an outer conductor whose inside diameter was 3.027 inches. The adjustable slug 67 in the end of the inner conductor 65 was variable between limits approximately ⅜ inch apart and could be reached through an access plug on the opposite side of the side arm transmission line 35 or 37 to which the particular spherical cavity was coupled.

The sleeve 79 forming part of the coupling for the first coaxial sideband filter 51 was of copper and had an outside diameter of 2⅛ inches and was 2⅝ inches long. The sleeve 79 forming the low impedance coupling for the second sideband filter 52 had a diameter of 2½ inches and was 1.85 inches long. Both of the sleeves 79 were centered opposite the end of the coupling slug 77 of the coaxial filter 51 or 52 with which they were associated.

The lumped reactance sleeve 81 was spaced down the side arm transmission line 35 or 37 approximately 0.20λ, 2.78 inches at this frequency. The lumped reactance sleeve 81 was of copper and had an outside diameter of 1.6 inches and was 1.585 inches long.

The spacing $S_1$ was determined according to the above formula and could be either 5.347 inches or 12.296 inches. Due to the outside diameter of the coaxial filter elements 51 and 52 themselves, the larger spacing was used.

The spacing $S_2$ according to the above formula could be either 2.488 inches or 9.895 inches. Because of the size of the reflection filters 47 and 49 and the nearest coaxial sideband filters 51 and 52, the larger spacings were used in this instance also.

In operation, the vestigial sideband filter and diplexer arrangement was adjusted as follows: A visual transmitter 39 was connected to the bridging network 11. This visual transmitter 39 had a carrier frequency of 849.25 megacycles with double sideband amplitude-modulated picture signals impressed thereon. An aural transmitter 41 was connected to one unbalanced transmission line 59 of the second bridging network 13. This aural transmitter had a center frequency of 853.75 megacycles and was frequency modulated ±75 kilocycles. The reflection filters 47 and 49 were tuned to series resonance at the frequency of the aural transmitter, 853.75 megacycles.

The first sideband filter 51 on each side arm transmission line 35, 36 and 37, 38 was tuned to present a series resonant shunt across the line at 847.75 megacycles. The capacitance inserted by the coupling sleeve 79 was used to parallel resonate the sideband filter 51 at picture carrier, 849.25 megacycles. The degree of coupling and method of tuning the first sideband filter 52 was adjusted so that the attenuation curve of the first filter 51 had a reactance slope of 0.407 ohm per megacycle. The shorting block 75 was spaced 8.971 inches from the outside surface of the outer conductor 36 or 38 at the point of coupling this first coaxial sideband filter 51.

The second sideband filter 52 on each side arm transmission line 35, 36 and 37, 38 was tuned to series resonance at 845.75 megacycles. As was the case with the first sideband filter 51, the capacitance between the coupling sleeve 79 and the coupling slug 77 was used to parallel resonate the second sideband filter 52 at picture carrier frequency, 849.25 megacycles. This second sideband filter 52 was adjusted to have a reactance slope of 0.098 ohm per megacycle. The distance from the shorting block 75 to the outside of the outer conductor

36 or 38 of the side arm transmission line was 8.407 inches.

In the arrangements described above in connection with Figs. 1, 2 and 3, where the reflection filters 47 and 49 are tuned at or near the frequency of the aural transmitter 41, the reflection filters 47, 49 must be able to dissipate the considerable amount of radio frequency power which appears as heat in the filter elements themselves. By altering the tuning of the reflection filters 47 and 49, they may be made resonant at a frequency somewhat different from that of the aural transmitter 41 and still perform all of the necessary functions. For television picture transmission, it has been found that the reflection filters 47 and 49 may be tuned to a frequency higher than the frequency of the aural transmitter 41.

In the arrangement shown in Fig. 4, an embodiment of the present invention incorporating this tuning feature for the reflection filters 47 and 49 will be described. Components which are the same as, or similar to, like components of Figs. 1, 2 or 3 are given the same reference numerals in Fig. 4.

Arranged along each side arm transmission line 35, 36 and 37, 38 are two sideband filter elements 51′ and 52′ and a reflection filter 47′. The sideband filter elements 51′ and 52′ are of the spherical cavity type, similar in construction to the sound notch reflection filters 47 and 49 described above in connection with Figs. 2 and 3.

The method of coupling the spherical cavity filter elements 51′, 52′ to the side arm transmission lines 35, 36 and 37, 38 may be the same as that described above in conjunction with the notch filters 47 and 49 shown in Fig. 2. Alternatively, instead of using short lengths of coaxial line to the spherical cavity resonators as described in Fig. 2, the spherical cavities may be mounted directly on the side arm transmission lines 35, 36 and 37, 38 as shown in Fig. 4. A coupling loop 67′ disposed in the interconductor space between the inner and outer conductors of the side arm transmission lines and extending into the spherical resonator can be used to couple the resonator to the line. When using a coupling loop 67′, an undercut portion 79′ may be used to parallel resonate the filters 51′, 52′ at another frequency. A short capacitive probe similar to the metallic slug 67 of Fig. 2 may be positioned in the opening between the spherical cavity elements 51′ and 52′ and the side arm transmission lines 35, 36 and 37, 38. Loop coupling may also be utilized for coaxial filter elements by providing a loop similar to the loop 67′ shown in this figure extending through an opening in the outer conductor 36 or 38 of the side arm transmission lines and into a coaxial cavity. The choice of the particular coupling arrangement for each filter element along the side arm transmission lines 35, 36 and 37, 38 will depend upon the magnitude and sign of the susceptance component of admittance necessary to attain an iterative impedance match.

The spacing $S_1$ between the two sideband filters 51′ and 52′ may be an odd quarter-wavelength electrically at a frequency within the passband for which no attenuation is desired for the design conditions described in detail in conjunction with Fig. 2. Because of the spherical cavity type of filter used in this embodiment, it is more convenient to utilize three-fourths or five-fourths wavelength spacing. Other spacings can be successfully operated for other design conditions.

The reflection filters 47′ may conveniently be of the coaxial type, although spherical, ellipsoidal, cylindrical, cubical, polygonal, and other resonant cavities may be utilized if desired. The reflection filters 47′ are no longer tuned at or very near the frequency of the aural transmitter 41, and so are not truly "notch filters." For television picture and sound transmission, the reflection filters 47′ may be tuned 100 to 150 kilocycles above the frequency of the aural transmitter 51 for operation in the range from 470 to 890 megacycles. The reflection filters 47′ will then no longer put a deep notch in the picture passband at precisely the frequency of the aural transmitter, but will still perform the function of providing a low impedance path for the signal from the aural transmitter 41 so that this signal is reflected and impressed across the output terminals 31, 33 of the second bridging network 13 in push-pull relationship. The low impedance path formed at and above the sound frequency by the reflection filters 47′ will not be as nearly a short-circuit (for example, of the order of 1½ to 4 ohms across a 50-ohm line) as that accomplished by the reflection filters 47 and 49 described above with reference to Figs. 1, 2 and 3. On the other hand, the detuned reflection filters 47′ are not required to handle as large amounts of radio frequency power dissipation as when tuned to aural carrier.

Any signal from the aural transmitter 41 which is not returned to the second bridging network 13 by the action of the reflection filters 47′ will continue down the side arm transmission lines 35, 36 and 37, 38 and arrive at the first bridging network 11 in push-push relationship. This signal will therefore be dissipated in the dissipative resistance 45 and will not be coupled into the visual transmitter 39. The system of Fig. 4 enables any power dissipation at aural frequency in the diplexer unit to be handled mainly in the dissipative resistance 45 rather than in the reflection filter elements 47′.

Figure 4:
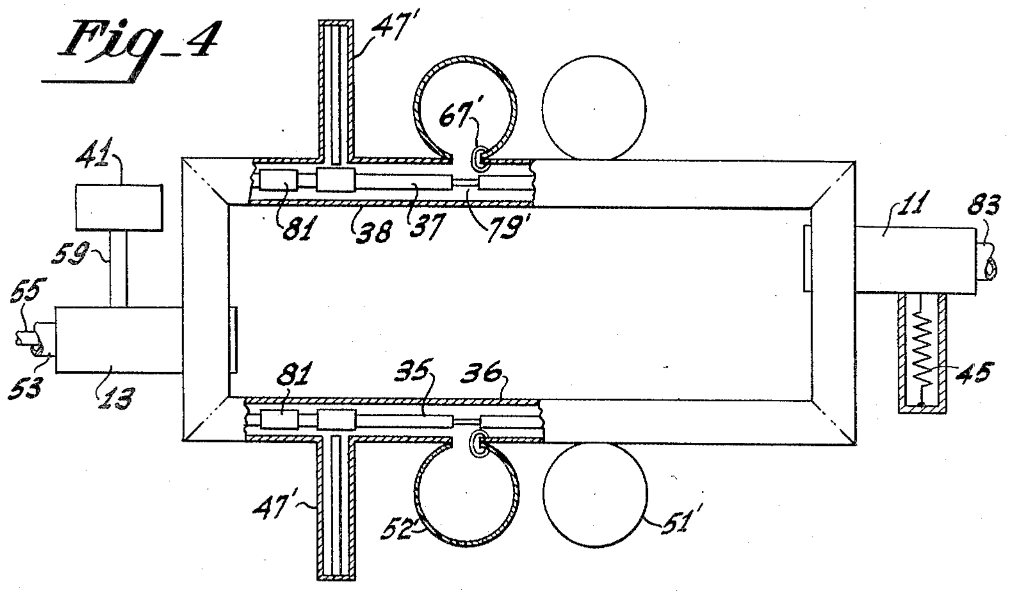
Fig. 4 is an illustration of an alternative form of the present invention.

In the arrangement shown in Fig. 4, the spacing of the reflection filters 47′ is determined so that the susceptance of the reflection filters is equal and opposite to the susceptance part of the normalized conductance of the transmission line which is due to the sideband filter elements 51′, 52′ at a frequency in the video passband for which high pass characteristics are desired. This compensates the shunting effect of the sideband filter elements 51′ and 52′ for frequencies which should not be attenuated.

An iterative impedance match is also obtained along the side arm lines 35, 36 and 37, 38 to remove the transmission line irregularities introduced by the coupling of the reflection filters 47′ at another frequency in the passband, for example, visual carrier frequency. A sleeve 81 of conductive or dielectric material is used as the equivalent of a lumped susceptance and is spaced from the point of coupling of the reflection filters 47′ to the side arm transmission line the necessary distance to parallel resonate or compensate for the susceptance of the reflection filters 47′ at visual carrier.

Figure 5:
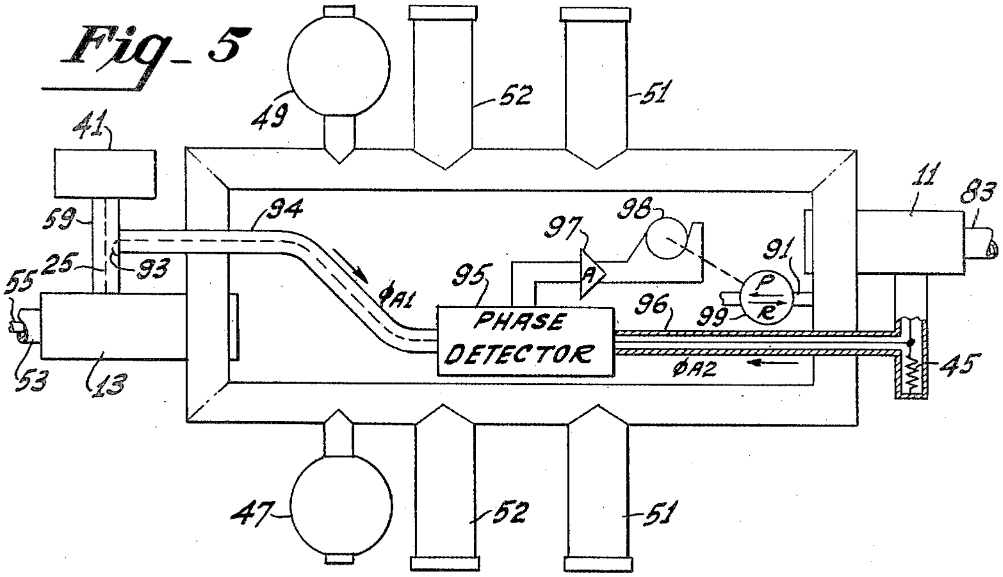
Fig. 5 shows an embodiment of the invention provided with an arrangement for tuning the notch reflection filters.

Referring now to Fig. 5, there is shown an embodiment of the invention like that of Fig. 2 which is provided with an arrangement for tuning the notch reflection filters 47, 49 by regulating the gas pressure within the diplexer and filter unit. The entire diplexer and filter combination is sealed from the surrounding air by making all of the connections, flanges, shorting blocks and similar hardware gastight. The unit is provided with a port 91 to which a source of gas or air under pressure may be attached if an operating pressure above atmospheric pressure is to be utilized. If pressures below that of the surrounding atmosphere may be required, a reversible flow pump may be connected to the port 91. The pressure within the diplexer and filter unit above or below atmospheric is then controlled by operating such a reversible flow pump in the proper direction.

The gas or air pressure inside of the diplexer unit affects the tuning of the reflection filters 47, 49 by varying two parameters of the reflection filters. A change in pressure varies the dielectric constant of the gaseous medium inside the cavity resonator reflection filters 47, 49 and also changes the actual mechanical size of the cavities 47 and 49 themselves. Increasing the pressure inside the diplexer and filter unit will increase the size of the reflection filters 47 and 49 and increases also the dielectric constant of the gas medium. Both of these effects act to lower the resonant frequency of the filter cavities 47, 49 as the gas pressure is increased. In a physical construction of the invention like the actual embodiment described above in connection with Figs. 2 and 3, it was found that with spherical reflection filters 47, 49 of copper and dry nitrogen as the gas within the filter and diplexer unit, the change in resonant frequency of the reflection filters 47 and 49 was due about one-half to change in mechanical size and one-half to the change in dielectric constant of the dry nitrogen within the unit.

The tuning of the reflection filters 47 and 49 may be automatically determined on a continuous basis by a phase comparison circuit. The tuning of the reflection filters affects transmission parameters, such as phase velocity, for frequencies within the vicinity of resonance of the reflection filters 47, 49. The phase shift between a point on the input line 25, 59 from the aural transmitter 41 and the small fraction of the aural transmitter signal appearing across the dissipative load 45 is proportional to the tuning of the reflection filters 47 and 49. A sample of the signal from the aural transmitter 41 is extracted from the transmission line 25, 59 by means of a pickup loop or directional coupler 93. This signal is indicated on the drawing as $\phi_{A1}$ and is fed by a transmission line 94 to one input of a phase detector 95. A second transmission line 96 is connected across the dissipative load resistor 45 to produce the sample of aural carrier energy therein and is fed to the other input of the phase detector 95. This second sample of energy is designated on the drawing as $\phi_{A2}$.

The phase detector 95 may be any of several well-known in the art capable of comparing two alternating current voltages to produce a potential representative of the instantaneous phase difference between the two applied voltages. Such a phase detector may be found in U. S. Patent 2,288,025 to Pomeroy, granted June 30, 1942. For the present application of such a phase detector as shown in the patent referred to, the signal designated $\phi_{A1}$ is connected across one pair of input terminals and the signal designated $\phi_{A2}$ is connected across the other pair of input terminals. The output is a direct potential representative of the instantaneous phase difference between the two signals. The direct potential output voltage is then applied, after being amplified by an amplifier 97, if necessary, to a reversible direct current motor 98 mechanically coupled to a reversible flow pump 99, or may be utilized as the controlling voltage of a pressure regulation servomechanism, for example, an electromagnetically controlled pressure regulator valve.

The operation of the tuning apparatus is as follows: If the phase detector 95 indicates that the reflection filters 47, 49 are tuned higher than the desired operating frequency, the motor 98 rotates the pump 99 to exhaust gas therefrom and decrease the pressure within the filter and diplexer unit. In the opposite condition, where the reflection filters 47, 49 are tuned to a frequency higher than the desired frequency, the phase detector signal causes the motor 98 to rotate the pump 99 to pump gas into the unit to increase the pressure therein.

The direct potential output voltage from the phase detector 95 may be utilized to control an alternating current signal for operating a reversible alternating current motor. In such a system, the output voltage from the phase detector 95 actuates a phase shifting mechanism operating on the phase displacement of the alternating voltage applied to one set of windings of the reversible motor, and a reference phase is applied to the other set of windings. The sense of rotation of the reversible alternating current motor is then controlled by the relative phase of the two alternating voltages applied.

Figure 5A:
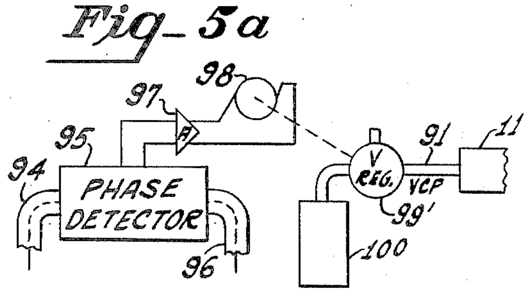
Fig. 5A shows a modification of the tuning arrangement of Fig. 5.

In Fig. 5A there is shown a modification of Fig. 5 wherein the reversible flow pump 99 is directly replaced with a variable pressure regulating valve 99′ of the type wherein the pressure to be maintained is adjusted by a rotary shaft. The control shaft of the regultaing valve 99' is coupled to the reversible motor 98. A source 100 of gas under pressure is required in conjunction with such a regulating valve 99'.

The operation of the apparatus shown in Fig. 5A is similar to that discussed in connection with Fig. 5. With the constant pressure regulating valve 99', the pressure inside the diplexer and filter unit will always be maintained above atmospheric pressure. If the phase detector 95 indicates that the filters 47, 49 of Fig. 5 are tuned lower than the desired operating frequency, the reversible motor 98 rotates the shaft of the pressure regulating valve 99' in a direction to decrease the pressure within the filter and diplexer unit, and the regulating valve 99' exhausts some of the gas in the filter and diplexer unit to the surrounding atmosphere. In the opposite condition of detuning, where the reflection filters 47 and 49 of Fig. 5 are tuned to a frequency higher than the desired frequency, the reversible motor 98, in response to the signal from the phase detector 97, will rotate the shaft of the regulating valve 99' in a direction to increase the pressure within the filter and diplexer unit. The regulating valve 99' then feeds gas from the source 100 through the port 91 to increase the pressure within the filter and diplexer unit to the proper value to adjust the tuning of the reflection filters 47 and 49 to the desired frequency.

Figures 6, 7:
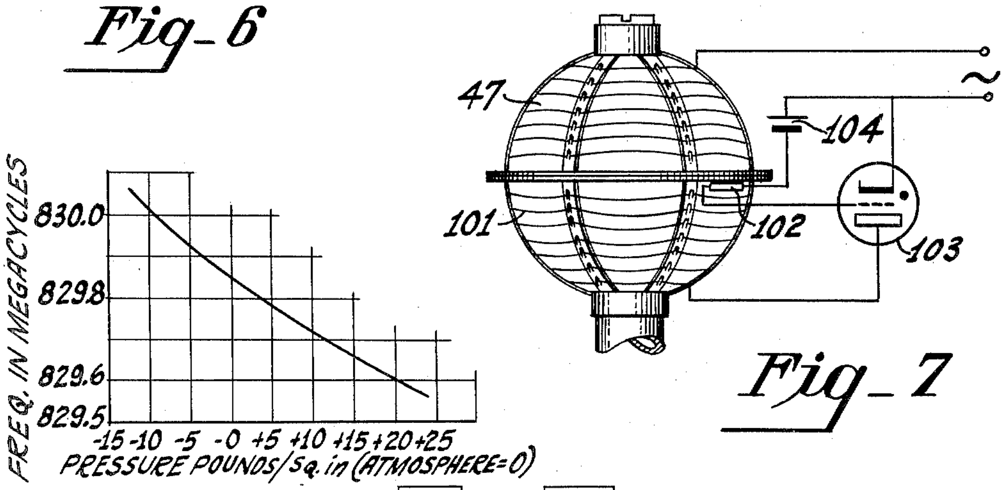
Fig. 6 is a curve illustrative of a principle of operation of the tuning system of Figs. 5 and 5A.
Fig. 7 shows a further fine tuning arrangement for the reflection filters associated with this invention.

In Fig. 6 there is shown a representative curve illustrating the variation of the resonant frequency of a spherical cavity resonator with changes in gas pressure. The particular curve shown was obtained with a 12-inch copper sphere used as the resonator with dry nitrogen as the gas inside the spherical cavity. With a change in pressure from 24 pounds per square inch above atmospheric pressure to 9 pounds per square inch below atmospheric pressure, the resonant frequency of the resonator varied smoothly between 829.56 megacycles and 830 megacycles, a difference of 440 kilocycles with a change in internal pressure of 33 pounds per square inch.

It should be pointed out with reference to Figs. 5 and 6 that the fine tuning of the sound notch reflection filters 47 and 49 may be accomplished manually as well as automatically. Further, the pressure regulation apparatus for tuning the diplexer and filter unit may be located at a point remote from the diplexer and filter unit itself. For example, where it becomes necessary to locate the diplexer and filter unit in an inaccessible part of a transmitting station, the samples of signal energy in the transmission lines 94 and 96 may be terminated into radio frequency amplitude or phase measuring circuits adjacent to a gas pressure regulating valve. The transmitter attendant can then visually compare the indications on the radio frequency measuring apparatus and adjust the gas pressure at the remote point to tune the reflection filters 47, 49 to the proper operating frequency. Fig. 6 shows that a change of one pound per square inch of pressure inside the diplexer and filter unit will produce a change in resonant frequency of about 13 kilocycles, making it possible for the transmitter attendant to adjust the tuning of the reflection filters 47, 49 very accurately from this remote point.

Fig. 7 illustrates a further fine tuning arrangement which consists of regulating the operating temperature of the reflection filters to maintain them at the proper size. In this arrangement, a reflection filter 47 has intimately associated with the surface thereof a means for adding heat to the resonator structure to maintain the temperature thereof higher than the ambient. In Fig. 7, a heater wire 101 is wrapped in a plurality of turns around the resonator structure 47 and is in intimate physical relationship but electrically insulated from the surface thereof. Thermoresponsive means, such as a thermocouple 102, or a plurality of such thermocoples (also termed a thermopile) are placed in physical contact with the surface of the reflection filter 47 and are utilized to control a source of heating current.

A circuit arrangement for thermocouple control of the external heating current is shown as a grid-controlled gas tube, such as a thyratron 103. The thyratron 103 is placed in series with a source of alternating current energy and the heater wire 101. As is understood in the art, the anode-to-cathode ignition voltage of a thyratron varies inversely with the applied grid voltage. As the alternating voltage across the thyratron 103 goes positive at the anode with respect to the cathode, the portion of the cycle over which the thyratron 103 is ignited depends upon the grid-cathode potential. A biasing potential source 104 is connected between the grid and cathode of the thyratron 103 in series with the thermocouple 102. The negative potential lead of the thermocouple 102 is connected to the grid of the thyratron 103.

The thermocouple 102 varies the ignition voltage and therefore the percentage of ignition time per cycle in accordance with the temperature of the reflection filter 47.

As the reflection filter 47 exceeds the desired operating temperature, the total portion of the alternating current cycle impressed across the heater wire 101 becomes less and less, causing the reflection filter 47 to give up heat to the surrounding atmosphere faster than heat is supplied thereto by the heater wire 101. The reverse operation will, of course, be obtained when the reflection filter 47 reaches a temperature below that necessary to maintain it at the proper size for resonant operation at the desired frequency. In the arrangement shown in Fig. 7, temperatures considerably above the ambient are utilized for the operating range. Operating temperatures from 50° to 60° C. above the ambient provide sufficient temperature difference between the reflection filter 47 and the surrounding atmosphere for the reflection filter 47 to easily dissipate 500 watts of power with moderate ventilation. It should also be noted at this point that at the maximum temperature expected to be encountered in operation, that the thermocouple 102 and the biasing potential source 104 should produce a sufficiently negative voltage to cut off the thyratron throughout the entire alternating current cycle to allow for fast cooling.

Figures 8, 9:
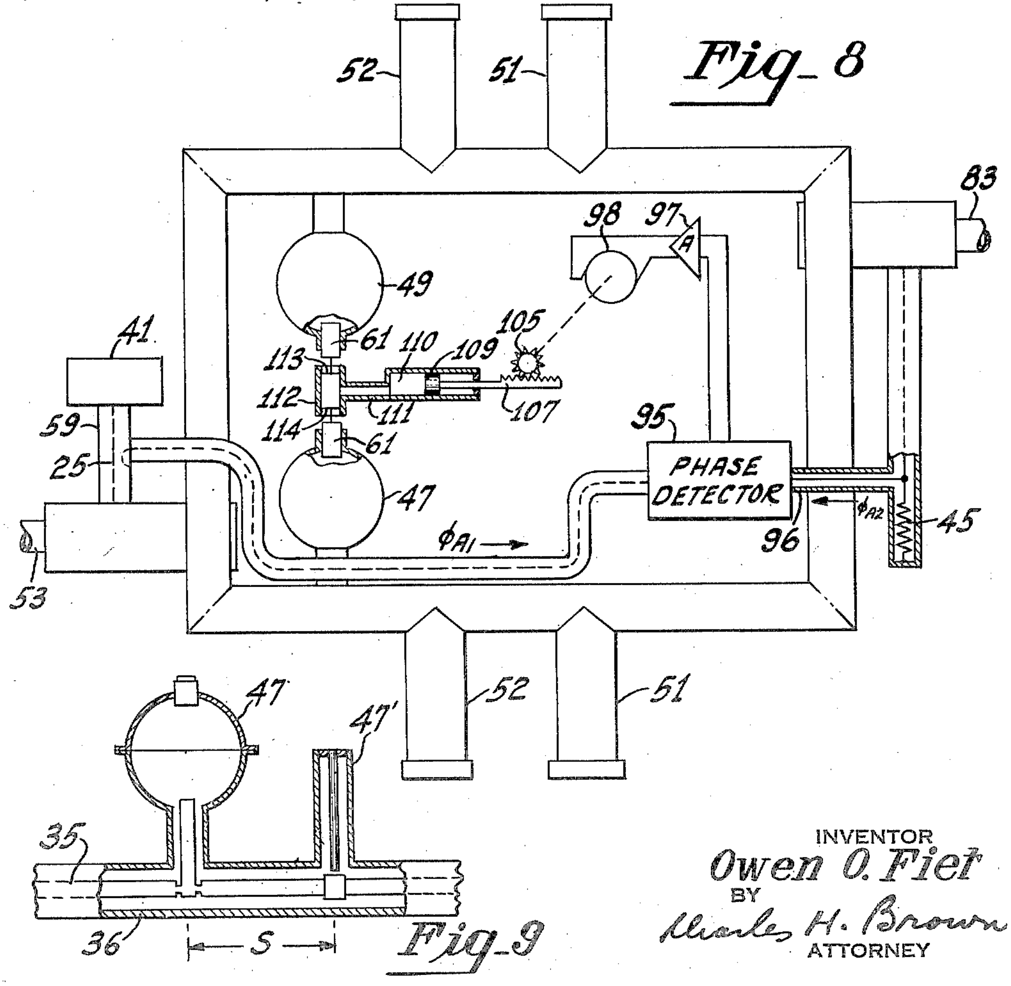
Fig. 8 shows a schematic arrangement of a mechanical system for tuning the reflection filters in association with this invention.
Fig. 9 shows a modification of one portion of the invention.

Fig. 8 shows a tuning arrangement for the reflection filters 47, 49 in which the tuning slugs 61 are mechanically moved to adjust the operating frequency of the resonant cavities 47, 49. This mechanical movement may be accomplished by known types of mechanical linkage, a specific form of which is shown in this figure. Utilizing a phase detector 95 to compare samples of the two signals $\phi_{A1}$ and $\phi_{A2}$, as described in connection with Fig. 5, a reversible motor 98 is mechanically coupled to a pinion gear 105. The pinion gear 105 engages a rack 107 mechanically linked to a hydraulic piston 109 which operates within a hydraulic cylinder 110. A conduit 111 connects the hydraulic cylinder 110 with the interior of a controlled hydraulic cylinder 112. The hydraulic cylinder 110, the conduit 111, and the controlled hydraulic cylinder 112 are all filled with a hydraulic fluid. Pistons 113 and 114 form the closing members of the controlled hydraulic cylinder 112 and are mechanically coupled to the tuning slugs 61.

In operation, the apparatus of Fig. 8 is as follows: if the phase detector 95 indicates that the reflection filters 47, 49 are tuned lower than the desired operating frequency, the reversible motor 98 rotates the pinion gear 105 in a direction to advance the rack 107 and piston 109 into the hydraulic cylinder 110. This forces hydraulic fluid into the controlled cylinder 112. The presence of this additional hydraulic fluid in the controlled cylinder 112 forces each of the pistons 113 and 114 away from the center of the controlled cylinder 112. This displacement of the pistons 113 and 114 moves both of the tuning slugs 61 farther into the reflection filters 47 and 49 to decrease the resonant operating frequency thereof. The reverse operation takes place in a similar manner, with the result being that the tuning slugs 61 are retracted from their initial position in the reflection filters 47, 49.

Means are provided to force the pistons 113 and 114 in the controlled hydraulic cylinder 112 toward each other. One arrangement for accomplishing this force would be a spring linkage within the controlled cylinder 112. Such spring linkage has not been shown in the drawing for the sake of clarity and simplicity. Further, if the entire diplexer and filter unit is maintained at a pressure somewhat above atmospheric pressure, the pressure of the gas inside the unit may be used to return the tuning slugs 61 and the pistons 113 and 114 without the necessity for spring biasing means.

Referring now to Fig. 9, there is shown a portion of one side arm transmission line 35, 36, having two notch filter elements 47 and 47′ coupled thereto, it being understood that a similar arrangement appears in the other side arm transmission line 37, 38, not shown here in the interest of simplicity in drawing. One of the notch filter elements 47 is tuned at or very near the sound frequency and is closer to the aural transmitter and provides a very low impedance path for shunting the sound frequency. The second notch filter 47′ may be tuned to the same frequency as the first notch filter 47. The function of the second notch filter 47′ is to tune out the susceptance of the first notch filter 47 at a frequency in the passband of the diplexer and filter unit for which high pass characteristics are desired. The second notch filter 47′ is spaced down the side arm transmission line 35, 36 a distance S so that the susceptance of the second notch filter 47′ compensates the shunting effect of the first notch filter 47 for frequencies in the passband which should not be attenuated. If both notch filters are tuned to the same frequency, the spacing S therebetween will be in the range of one-eighth to one-quarter wavelength at the frequency of the aural transmitter.

The second notch filter 47′ may be tuned to a frequency different than the first notch filter 47 and still operate in the same way to achieve the same result just described where both filters are tuned to the same frequency. Whether the two notch filter elements 47, 47′ are tuned to the same or different frequencies, better compensation over the band of frequencies for which high pass characteristics are desired will be attained when the reactive component of admittance of both filter elements 47, 47′ is equal over that portion of the band for which high pass characteristics are desired.

The arrangement shown in Fig. 9 is particularly valuable in television notch diplexing applications for improving the high frequency passband characteristics of a diplexer or the diplexer and filter combination of this invention. This double notch form of the present invention makes possible the use of less expensive, lower Q filter elements to provide high quality performance which is extremely difficult to obtain with conventional systems.

What is claimed is:

1. A double bridge diplexing arrangement for selective transmission of radio frequency energy within a band of frequencies, comprising a pair of bridging networks, two equal-length side arm transmission lines interconnecting said bridging networks, a highly selective reflection filter connected across each of said side arm transmission lines at prearranged points on said side arm transmission lines differing in electrical distance from one of said bridging networks by an odd multiple of a quarter wavelength at a frequency within said band, said reflection filters being tuned to present a low impedance to radio frequency energy within said band of frequencies, and additional filter elements coupled across said side arm transmission lines at spaced points therealong, said additional filter elements being tuned to present a low impedance to radio frequency energy outside said band of frequencies and including a reactance as part of the coupling between said additional filter elements and said side arm transmission lines, said reactance acting to tune said additional filter elements to parallel resonance at a predetermined frequency within said band.

2. A double bridge diplexing arrangement for selective transmission of radio frequency energy within a band of frequencies, comprising a pair of bridging networks, two equal-length side arm transmission lines interconnecting said bridging networks, a highly selective reflection filter connected across each of said side arm transmission lines at prearranged points on said side arm transmission lines differing in electrical distance from one of said bridging networks by an odd multiple of a quarter wavelength at a frequency within said band, said reflection filters being tuned to present a low impedance to radio frequency energy within said band of frequencies, and additional filter elements coupled across said side arm transmission lines at spaced points therealong, said additional filter elements being tuned to present a low impedance to radio frequency energy outside said band of frequencies and including a reactance as part of the coupling between said additional filter elements and said side arm transmission lines, said reactance acting to tune said additional filter elements to parallel resonance at a predetermined frequency within said band, said reflection filters having a susceptance so chosen that in combination with the spacing of said reflection filters from said additional filter elements the susceptance of said additional filter elements is balanced out at a second predetermined frequency within said band.

3. A double bridge diplexing arrangement for selective transmission of radio frequency energy within a wide band of frequencies, comprising a pair of bridging networks each having a pair of balanced terminals and two pairs of unbalanced terminals, two equal-length side arm transmission lines interconnecting said balanced terminals of said bridging networks, a resistive element connected to one pair of unbalanced terminals of said first bridging network, a first source of radio frequency energy connected to said other unbalanced terminals of said first bridging network, a second source of radio frequency energy connected to said second bridging network, an output circuit connected across the other pair of unbalanced terminals in said second bridging network, a highly selective reflection filter coupled across each of said side arm transmission lines at a prearranged point, said filters being tuned to series resonance at frequencies falling within said band of frequencies, the distances from one bridging network to said reflection filters along said lines differing by a quarter-wavelength at a frequency in said band of frequencies, and additional filter elements coupled to said side arm transmission line at spaced points therealong, each of said additional filter elements being tuned to series resonance to present a low impedance to frequencies immediately outside said band of frequencies and being further tuned to parallel resonance at a predetermined frequency within said band.

4. A double bridge diplexing arrangement for selective transmission of radio frequency energy within a wide band of frequencies, comprising a pair of bridging networks each having a pair of balanced terminals and two pairs of unbalanced terminals, two equal length side arm transmission lines interconnecting said balanced terminals of said bridging networks, a resistive element connected to one pair of unbalanced terminals of one bridging network, a first source of radio frequency energy connected to said other unbalanced terminals of said one bridging network, a second source of radio frequency energy connected to the other bridging network, an output circuit connected across the other pair of unbalanced terminals of said other bridging network, a highly selective reflection filter coupled across each of said side arm transmission lines at prearranged points, the distances from one bridging network to said reflection filters differing by a quarter-wavelength at a predetermined frequency in said band of frequencies, and two additional filter elements coupled across said side arm transmission lines at spaced points therealong, each of said additional filter elements being tuned to present a low impedance to frequencies immediately outside said band of frequencies, and being tuned to parallel resonance at said predetermined frequency within said band, the point of connection of said reflection filters being so chosen that the susceptance of said reflection filters balances out the susceptance of said additional filter elements at a second predetermined frequency within said band.

5. A double bridge diplexing arrangement for selective transmission of radio frequency energy within a wide band of frequencies, comprising a pair of bridging networks each having balanced terminals and unbalanced terminals, two equal-length side arm transmission lines interconnecting said balanced terminals of said bridging networks, a resistive element connected to one pair of unbalanced terminals of one bridging network, a first source of radio frequency energy connected to said other unbalanced terminals of said one bridging network, a second source of radio frequency energy connected to the other bridging network, an output circuit connected across the other pair of unbalanced terminals of said other bridging network, a highly selective reflection filter coupled across each of said side arm transmission lines at a prearranged point and tuned to resonance near the frequency of said second source, the distances from one bridging network to said reflection filter differing by a quarter-wavelength at the frequency of said first source, and additional filter elements coupled to said side arm transmission line at spaced points therealong, each of said additional filter elements being tuned to present a low shunt impedance to frequencies immediately outside said band of frequencies, and being tuned to parallel resonance at said frequency of said first source.

6. A double bridge diplexing arrangement for selective transmission of radio frequency energy within a wide band of frequencies, comprising first and second bridging networks, each having balanced terminals and unbalanced terminals, two equal-length side arm transmission lines interconnecting said balanced terminals of said bridging networks, a resistive element connected to one pair of unbalanced terminals of said first bridging network, a first source of radio frequency energy connected to said other unbalanced terminals of said first bridging network, a second source of radio frequency energy connected to said second bridging network, an output circuit connected across the other pair of unbalanced terminals of said second bridging network, a highly selective reflection filter coupled across each of said side arm transmission lines at a prearranged point and tuned to resonance near the frequency of said second source, the distances from one bridging network to said reflection filter differing by a quarter-wavelength at the frequency of said first source, and additional filter elements coupled to said side arm transmission line at spaced points therealong, each of said additional filter elements being tuned to present a low shunt impedance to frequencies immediately outside said band of frequencies, and being tuned to parallel resonance at said frequency of said first source within said predetermined band, the point of connection of said reflection filters being so chosen that the susceptance of said reflection filters compensates the susceptance of said additional filter elements at a predetermined frequency within said band different from the frequencies of said sources.

7. A diplexer and sideband filter combination for selective transmission of radio frequency energy within a band of frequencies, comprising a pair of bridging networks, two side arm transmission lines interconnecting said bridging networks, reflection filters coupled across each of said side arm transmission lines at points differing in spacing from said bridging networks by an odd multiple of a quarter wavelength at a predetermined frequency, said reflection filters being tuned to present a low impedance to radio frequency energy within said band of frequencies, additional filter elements coupled across said side arm transmission lines at spaced points therealong and tuned to present a low impedance to radio frequency energy outside said band of frequencies, the coupling reactance of said additional filter elements to said transmission line acting to tune said additional filter elements to parallel resonance at a frequency within said band.

8. A diplexer and sideband filter combination for selective transmission of radio frequency energy within a band of frequencies, comprising a pair of bridging networks, two side arm transmission lines interconnecting said bridging networks, reflection filters coupled across each of said side arm transmission lines at points differing in electrical distance from said bridging networks by an odd multiple of a quarter wavelength at a predetermined frequency, said reflection filters being tuned to present a low impedance to radio frequency energy within said band of frequencies, additional filter elements coupled across said side arm transmission lines at spaced points therealong and tuned to present a low impedance to radio frequency energy outside said band of frequencies.

9. A diplexing arrangement for selective transmission of radio frequency energy within a band of frequencies comprising a pair of bridging networks, two side arm transmission lines inter-connecting said bridging networks, reflection filters coupled across each of said side arm transmission lines at predetermined points on said side arm transmission lines differing in electrical distance from one of said bridging networks by an odd multiple of a quarter wavelength at a frequency within said band, said reflection filters being tuned to present a low impedance to radio frequency energy within said band of frequencies, additional filter elements coupled across said side arm transmission lines at spaced points therealong and tuned to a predetermined frequency outside said band of frequencies, the susceptance of said additional filter elements and the spacing of said additional filter elements from said reflection filters compensating the susceptance of said reflection filters at a second predetermined frequency within said band.

10. A diplexer and sideband filter combination for selective transmission of radio frequency energy within a band of frequencies, comprising a pair of bridging networks each having balanced terminals and unbalanced terminals, two equal length side arm transmission lines interconnecting said balanced terminals of said bridging networks, a resistive element connected to unbalanced terminals of one bridging network, a first source of radio frequency energy connected to other unbalanced terminals of said one bridging network, a second source of radio frequency energy connected to the other bridging network, an output circuit connected across the other unbalanced terminals of said other bridging network, highly selective reflection filters coupled across each of said side arm transmission lines at points differing in electrical distance from said bridging networks by an odd multiple of a quarter-wavelength at a predetermined frequency and tuned to resonance near the frequency of said second source, additional filter elements coupled across said side arm transmission lines at spaced points therealong and tuned to present a low impedance to radio frequency energy outside said band of requencies and tuned to present a high impedance at frequencies of said first source, and means for tuning said reflection filters in response to a change in a transmission parameter modified by the tuning of said reflection filters, said means for tuning including apparatus effective to alter the mechanical size of said reflection filters.

11. The combination as defined in claim 10 wherein said means for tuning said reflection filters comprises a first comparison circuit having two input circuits and an output circuit, said input circuits coupled adjacent each of said bridging networks to continuously compare signals at said predetermined frequency, electromechanical means coupled to said output circuit, mechanical apparatus coupled to said electromechanical means effective to alter the mechanical size of said reflection filters.

12. The combination as defined in claim 10 wherein said apparatus effective to alter the mechanical size of said reflection filters comprises a gas pressure regulating device communicating with the interior of said reflection filters.

13. The combination as defined in claim 10 wherein said apparatus effective to alter the mechanical size of said reflection filters comprises a hydraulically operated tuning slug.

14. The combination as defined in claim 10 wherein said apparatus effective to alter the mechanical size of said reflection filters comprises a heater source in intimate physical contact with the exterior of said reflection filters.

15. The combination as defined in claim 10 wherein said apparatus effective to alter the mechanical size of said reflection filters comprises a reversible flow gas pump communicating with the interior of said reflection filters.

16. The combination as defined in claim 10 wherein said apparatus effective to alter the mechanical size of said reflection filters comprises a variable pressure regulating valve communicating with the interior of said reflection filters, and a source of gas under a pressure higher than atmospheric coupled to said regulating valve.

17. The combination as defined in claim 5 wherein said additional filter elements are resonant cavities whose mechanical size is varied to tune said additional elements to resonance, and whose reactance coupling to said side arm transmission line comprises a variable position probe in capacitive relation to a conductor of said side arm transmission line, whereby the resonant frequency and electrical coupling of the filter element to the side arm transmission lines are independently adjustable.

18. A double-bridge notch diplexing arrangement for diplexing two program-modulated radio frequency signals comprising first and second bridging networks, each having a pair of balanced terminals and two pairs of unbalanced terminals, two equal length side arm transmission lines inter-connecting said balanced terminals of said bridging networks, a resistive element connected to one pair of unbalanced terminals of said first bridging network, a first source of program-modulated radio frequency energy connected to said other unbalanced terminals of said first bridging network, a second source of program-modulated radio frequency energy connected to said second bridging network, an output circuit connected across the other pair of unbalanced terminals in said second bridging network, a highly selective reflection filter coupled across each of said side arm transmission lines at a prearranged point said reflection filters being tuned to present a low impedance to radio frequency energy within said band of frequencies, the distances from one bridging network to said reflection filters differing by a quarter-wavelength at the frequency of said first source, and additional filter elements coupled to said side arm transmission lines at spaced points therealong, each of said additional filter elements being tuned to series resonance to present a low impedance to frequencies immediately outside said band of frequencies and being further tuned to parallel resonance at the frequency of said first source of program-modulated energy.

19. A double-bridge notch diplexing arrangement for diplexing two program-modulated radio frequency signals comprising first and second bridging networks, each of said networks having a pair of balanced terminals and two pairs of unbalanced terminals, two equal-length side arm transmission lines interconnecting said balanced terminals of said bridging networks, a resistive element connected to one pair of unbalanced terminals of said first bridging network, a first source of program-modulated radio frequency energy connected to said other unbalanced terminals of said first bridging network, a second source of program-modulated radio frequency energy connected to said second bridging network, an output circuit connected across the other pair of unbalanced terminals in said second bridging network, a highly selective reflection filter coupled across each of said side arm transmission lines at a prearranged point and tuned to series resonance at the frequency of said second source, the distances from one bridging network to said reflection filters differing by a quarter-wavelength at the frequency of said first source, and additional filter elements coupled to said side arm transmission lines at spaced points therealong, each of said additional filter elements being tuned to series resonance to present a low impedance to frequencies immediately outside said band of frequencies and being further tuned to parallel resonance at the frequency of said first source of program-modulated energy, the spacing between the point of connection of said reflection filters and the nearest of said additional filter elements being the point at which the susceptance of said reflection filters is equal in magnitude and opposite in sign to the susceptance of said additional filter elements at a predetermined frequency within said band different than the frequencies of said first and second sources.

20. A diplexer and sideband filter combination for selective transmission of radio frequency energy within a band of frequencies, comprising a pair of bridging networks, two side arm transmission lines inter-connecting said bridging networks, reflection filters coupled across each of said side arm transmission lines at points differing in electrical distance from said bridging networks by an odd multiple of a quarter-wavelength at a predetermined frequency, said reflection filters being tuned to present a low impedance to radio frequency energy within said band of frequencies, additional filter elements coupled across said side arm transmission lines at spaced points therealong and tuned to present a low impedance to radio frequency energy outside said band of frequencies, and means for tuning said reflection filters, said means for tuning including apparatus effective to alter the mechanical size of said reflection filters.

21. The combination as defined in claim 19, and in addition, apparatus effective to alter the mechanical size of said reflection filters comprising a heater source in intimate physical contact with the exterior of said reflection filters.

22. A double bridge diplexing arrangement for selective transmission of radio frequency energy within a wide band of frequencies, comprising a pair of bridging networks each having a pair of balanced terminals and two pairs of unbalanced terminals, two equal length sidearm transmission lines interconnecting said balanced terminals of said bridging networks, a resistive element connected to one pair of unbalanced terminals of said first bridging network, a first source of relatively broadband radio frequency energy connected to said other unbalanced terminals of said first bridging network, a second source of relatively narrow band radio frequency energy connected to a first pair of unbalanced terminals of said second bridging network, the frequency of said second source falling within the frequency band of said first source, an output circuit connected across the other pair of unbalanced terminals in said second bridging network, a highly selective reflection filter coupled across each of said sidearm transmission lines at a predetermined point and tuned to reflect energy having the frequencies of said second source, the distances from one bridging network to said reflection filters along said lines differing by a quarter-wavelength at a frequency in said band of frequencies to be transmitted, and additional filter elements coupled to said sidearm transmission lines at spaced points thereon, each of said additional filter elements being tuned to reflect a portion of the non-overlapping frequencies from said first source to said resistive element.

23. A television transmitting system comprising, first and second bridging networks each having a pair of balanced terminals and two pairs of unbalanced terminals, two equal length sidearm transmission lines interconnecting said balanced terminals of said bridging networks, and absorbing resistor connected to one pair of unbalanced terminals of said first bridging network, a visual transmitter having its output connected to the other pair of said unbalanced terminals of said first bridging network, said visual transmitter providing a carrier and two sidebands, an aural transmitter having its output connected to one pair of said unbalanced terminals of said second bridging network, an antenna coupled to the other pair of unbalanced terminals of said second bridging network, a first set of rejection filters coupled to said sidearm transmission lines and tuned to reflect energy at the frequency of said aural transmitter, a second set of rejection filters coupled to said sidearm transmission lines and tuned to reflect frequencies within the range of one of said sidebands from said visual transmitter but outside the range of frequencies to be applied to said antenna, thereby to provide visual-aural diplexing and sideband filtering.

24. In a television transmitting system, the combination of, first and second bridging networks each having a pair of balanced terminals and two pairs of unbalanced terminals, two equal length sidearm transmission lines interconnecting said balanced terminals of said bridging networks, an absorbing resistor connected to one pair of unbalanced terminals of said first bridging network, a visual transmitter having its output connected to the other pair of said unbalanced terminals of said first bridging networks, said visual transmitter providing a carrier and two sidebands, an antenna coupled to the one pair of said unbalanced terminals of said second bridging network, and a set of rejection filters coupled to said sidearm transmission lines and tuned to reflect frequencies within the range of one of said sidebands from said visual transmitter but outside the range of frequencies to be applied to said antenna, whereby to provide sideband filtering of said visual signal.

25. A diplexer and sideband filter combination for selective transmission of radio frequency energy within a band of frequencies, comprising a pair of bridging networks, two sidearm transmission lines interconnecting said bridging networks, reflection filters coupled across each of said sidearm transmission lines at points differing in electrical distance from said bridging networks by an odd multiple of a quarter wavelength at a predetermined frequency, additional filter elements coupled across said sidearm transmission lines at spaced points therealong and tuned to present a low impedance to radio frequency energy outside said band of frequencies, and means for tuning said reflection filters by altering the mechanical size thereof, including, a source of alternating current having two terminals, a resistive wire in intimate physical contact with the exterior of said reflection filters, said wire having one end connected to one terminal of said source, thermocouple means in intimate physical contact with the exterior of said reflection filters, a grid controlled gaseous discharge device, means electrically connecting said thermocouple means between the cathode and the control grid of said gaseous discharge device, a connection from the anode of said gaseous discharge device to the other end of said resistive wire, and a further connection from the cathode of said gaseous discharge device to the other terminal of said source.

26. A diplexing and filtering arrangement, comprising, a transmission line network including two input terminals and two output terminals, a source of relatively wideband signals coupled to one of said input terminals, a source of relatively narrow band signals coupled to the other of said input terminals, each of said signals including a carrier and sidebands, said carriers being spaced apart in frequency, a first high Q filter means positioned in said network between said input terminals and tuned to reflect signals having the frequency of said narrow band signal, a second filter means positioned in said network between said input terminals and tuned to reflect signals having the frequencies of the one of the sidebands of said wide band signal which is on the opposite side of the carrier of said wide band signal from said narrow band signal, an absorbing resistor coupled to one of said output terminals, and means to derive a combined and filtered signal from the other one of said output terminals.

References Cited in the file of this patent

UNITED STATES PATENTS

| | | |
|---|---|---|
| 2,275,587 | Gluyas | Mar. 10, 1942 |
| 2,376,667 | Cunningham | May 22, 1945 |
| 2,414,785 | Harrison | Jan. 21, 1947 |
| 2,434,255 | Bond | Jan. 13, 1948 |
| 2,468,145 | Varian | Apr. 26, 1949 |
| 2,475,035 | Linder | July 5, 1949 |
| 2,484,798 | Bradley | Oct. 11, 1949 |
| 2,495,589 | Masters | Jan. 24, 1950 |
| 2,515,280 | Varian | July 18, 1950 |
| 2,530,679 | Brill | Nov. 21, 1950 |
| 2,531,447 | Lewis | Nov. 28, 1950 |
| 2,541,375 | Mumford | Feb. 13, 1951 |
| 2,545,472 | Kline | Mar. 20, 1951 |
| 2,600,949 | Wolf | June 17, 1952 |
| 2,611,030 | Sontheimer | Sept. 16, 1952 |